Patented Oct. 25, 1932

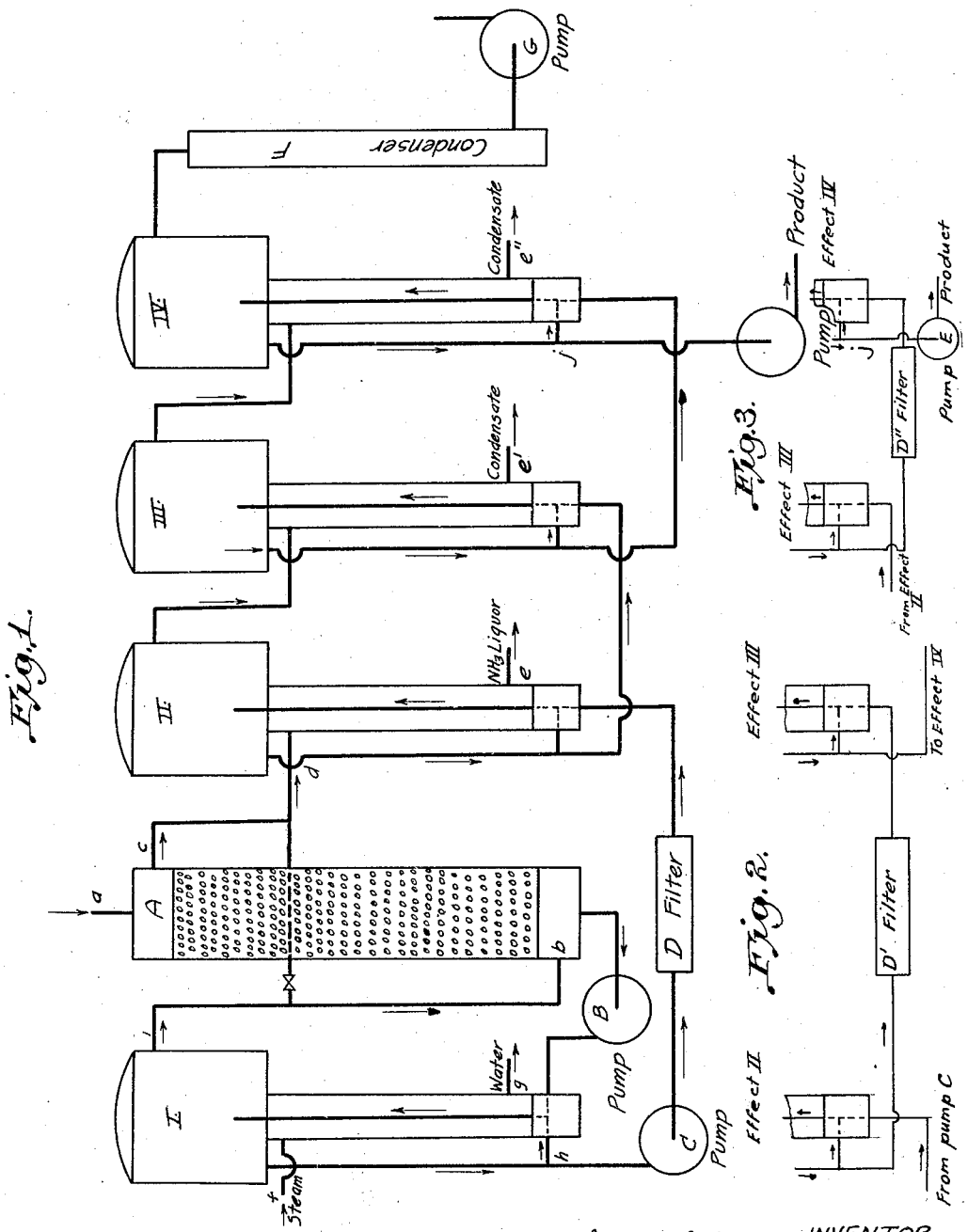

1,885,003

UNITED STATES PATENT OFFICE

LEONARD E. CARLSMITH, BENJAMIN C. BOECKELER, AND IGNACE J. KRCHMA, OF TERRE HAUTE, INDIANA, ASSIGNORS TO COMMERCIAL SOLVENTS CORPORATION, OF TERRE HAUTE, INDIANA, A CORPORATION OF MARYLAND

APPARATUS FOR THE RECOVERY OF AMMONIA FROM FERMENTATION MASHES

Application filed September 25, 1930. Serial No. 484,371.

The present invention relates to the recovery of useful products from dilute aqueous solutions thereof. More particularly, it relates to the recovery, by distillation, of ammonia and salts of organic acids from mashes resulting from the fermentation of cellulosic materials.

In various fermentation processes where acids are produced it is generally necessary to add to the mash from time to time sufficient alkaline material to neutralize the acids being formed in order that the fermentation may proceed to completion. This is particularly the case in the production of propionic and acetic acids by the fermentation of carbohydrates, etc. by means of propionic acid-forming bacteria; in the production of butyric acid by fermenting various carbohydrates; and in the so-called Langwell fermentation process. In the latter process, cellulosic material is fermented at temperatures ranging from 50° to 70° C. by means of thermophilic bacteria of the type usually found in stable manure, pond mud, the intestinal tract of herbiverous animals, etc. In order to complete the fermentation it is found necessary to maintain the hydrogen ion concentration of the fermenting mash within the limits of pH=5 and pH=9. A number of different materials may be suitably employed for this purpose, as for example, (a) oxides, hydroxides, carbonates or bicarbonates of alkali metals including the same ammonium compounds and ammonia, and (b) oxides, hydroxides, carbonates or bicarbonates of alkaline earth metals including magnesium in which cases compounds of alkali metals which cause the formation of insoluble alkaline earth metal compounds are added from time to time. The use of such materials as lime, calcium carbonate, or soda ash as the neutralizing medium is naturally much more economical than most of the other compounds enumerated. Calcium compounds, unfortunately, however, have a tendency to slow up the fermentation and soluble alkalies such as soda ash generally extract so much soluble organic matter from the fermenting cellulosic materials as to cause serious difficulties in the recovery of the products of the fermentation. The use of ammonia as the neutralizing agent overcomes most of these disadvantages, but due to its cost can only be employed on a commercial scale for this purpose when some suitable means of recovering the ammonia in a form fit for reuse in the process is available. Such a process is hereinafter set forth. It is distinctly understood also that the process is similarly applicable to the recovery of ammonia from other dilute solutions of ammonium salts.

The operation of the present invention may be illustrated by the use of ammonia neutralized mash from the Langwell fermentation process. The fermentation operation may be carried out substantially as set forth in U. S. Patents Nos. 1,443,881; 1,602,306; and 1,639,571, with the exception that ammonia or an ammonium compound such as the hydroxide, carbonate or bicarbonate, is used as the neutralizing agent with the result that when the fermentation is completed an aqueous mash remains which contains about 2.0 grams per 100 c. c. of ammonium salts of principally acetic, propionic, and butyric acids, and considerable unfermented cellulosic and lignous material, a considerable proportion of which is in such a form as to be separable from the liquid only with difficulty. Comminuted cellulosic material such as corncobs, straw, etc. may be used as the raw material, in which case it is generally necessary to add suitable nutrient substances such as distillery wastes like butyl-acetonic fermentation slop or inorganic materials like potassium sulfate, sodium phosphate, potassium chloride, etc.

In certain other fermentation processes, carbohydrates such as starch or sugars are the most suitable raw materials. In such cases it will be necessary to vary somewhat the kind and quantity of nutrient, the operating temperature, hydrogen ion concentration range, etc., depending upon the particular organism used as the means of promoting the fermentation. The present invention, however, is not particularly concerned with these factors and pertains only to the steps relating to neutralizing the fermenting medium with ammonia (including also ammonium hydroxide, carbonate and bicarbonate)

and recovering in usable form ammonia and the other products formed during the fermentations.

In order to recover the ammonia and the organic acid salts from the fermentation mash described above, as much of the cellulosic material as possible is preferably first removed by settling or filtration. To the liquor thus obtained is then added a sufficient amount of a non-volatile base which will react with the ammonium salts and give ammonium hydroxide or other easily decomposable ammonium compounds. Materials suitable for this purpose are non-volatile bases such as, for example, lime or calcium carbonate. In case lime is used the mash will at this point contain ammonium hydroxide, calcium acetate, calcium propionate, calcium butyrate, etc. together with small amounts of dissolved and suspended organic matter. This material is then fed into a multiple effect evaporator of the type hereinafter described, where the ammonia is recovered and the salt solution concentrated.

Instead of sending the dilute liquor directly into one of the effects of the multiple evaporator, as has previously been suggested it has now been discovered that much more efficient results will be obtained if the dilute liquor is first passed thru a scrubbing tower where an appreciable proportion of the ammonia will be removed by the vapors from the first effect of the evaporator. In this way it is possible to remove practically all of the ammonia in the first effect of the evaporator instead of in the first and second effects, as has previously been suggested. The accompanying diagram will illustrate the type of apparatus and the method of operation which it is preferred to employ altho obviously both may be modified in certain respects without departing from the spirit of the invention.

In the description which follows and in the accompanying diagrams the effects of the evaporator have been numbered in the sequence of the vapor flow. However, it should be understood that the liquor may be fed thru the system in any order, provided the liquor passed thru the scrubbing tower always enters the same effect from which the vapor passing thru the scrubbing tower is taken.

Referring to Fig. 1 of the drawing, the process of the present invention may be carried out by introducing the mash containing about 2 grams of say a mixture of calcium acetate, calcium propionate, and calcium butyrate and about 0.6 gram of ammonia per 100 grams of solution thru the opening (a) into the scrubbing column (A) which may be packed with Raschig rings, coke or other suitable packing material, or it may contain bubble caps or perforated plates. As the dilute mash trickles down thru the packing material it comes in contact with vapor from the first effect of the multiple evaporator (I) which enters the scrubbing tower at (b). After the system has been in operation for a short time this hot vapor contains some ammonia collected in the first effect. The vapor leaving the top of the scrubbing tower at (c), and which contains the greater portion of the ammonia, enters the second effect evaporator (II) at (d) where it serves as the heating medium. The condensate from the heating elements of the various effects is withdrawn at (e), (e') and (e''). The condensate taken from the second effect heating element at (e) will contain the greater portion of the ammonia, as a rule above 96% being recovered at this point, and may be sent to the ammonia still for final treatment or re-used directly as a neutralizing agent in succeeding fermentations. A small amount of ammonia will also be present in the condensate at (e') and may be sent to the ammonia still or otherwise recovered, but in general the amount present at this point will be too small to justify the cost of its recovery by distillation. In case ammonia is to be recovered from the condensate at (e'), however, it is necessary, in order to realize the advantages of using the stripping column, that the ammonia from this condensate be distilled separately from that obtained at (e).

The dilute mash from the bottom of the scrubbing tower (A) is pumped by means of the pump (B) into the bottom of the first effect evaporator (I) in which it is heated by means of steam introduced at (f). The condensate from this steam is withdrawn at (g) and returned to the boilers. The dilute mash is circulated thru the first effect evaporator as indicated by the arrow, a portion being constantly withdrawn at the by-pass (h) and sent by the pump (C) thru the filter (D) where insoluble material such as excess lime or calcium carbonate, unfermented cellulosic material, etc. is removed. The liquor passing thru this filter and into the bottom of the second effect evaporator (II) has been almost completely freed from ammonia. The vapor from the first effect evaporator (I) and which contains the residual ammonia not removed in the scrubbing tower leaves the separator at (i) and is used as the heating medium for the scrubbing tower. A portion of this vapor may, if desired, be by-passed to the heating unit of the second effect.

After the removal of the ammonia, the residual liquor passes thru additional effects similar to the first effect and in such numbers as may be required to give the desired concentration of the liquor and the most desirable degree of steam economy. In the accompanying diagram four effects are shown, but it is understood that a lesser or greater number may be employed without any appreciable modification of the operating procedure, except that the liquor is filtered only after it leaves the effect into which the weakest liquor is fed. Under certain circumstances, however, it is sometimes desirable to filter the liquor after the second or third effect, rather than after the first effect, as for example, when prolonged boiling makes the liquor more easily filtered or when it is more economical to filter a smaller volume of liquid. The position of the filter between the second and third effects of the evaporator is illustrated in Fig. 2 and its position between the third and fourth effects is illustrated in Fig. 3 of the drawing.

The concentrated liquor is by-passed from the last effect at (j) and removed from the system by means of the pump (E).

The vapors from the last effect of the evaporator may be condensed by means of the condenser (F) and by the vapor pump (G) or by any other suitable means.

In case the liquor being treated contains little or no insoluble impurities it may be by-passed around the filter or the filter may even be omitted from the system. Certain other obvious modifications will naturally occur to one skilled in the art.

It should be understood also that it is not absolutely essential that the process be operated continuously, but may, if desired, be operated as a "batch" process. For example, the liquor leaving the scrubber may be concentrated to the degree necessary to recover the ammonia or the ammonia and salts in a single evaporator or in the first effect or two effects of a multiple effect evaporator. Such a process, however, is not as economical from the point of view of steam consumption as the preferred method of using a multiple effect evaporator.

The process hereinabove disclosed is claimed in a copending application, U. S. Serial No. 484,370 filed September 25, 1930.

What is claimed is:

1. A distillation apparatus comprising a scrubbing column, a multiple effect evaporator, a filter connected between two of the effects of said evaporator, means for supplying heating medium to the first effect of said evaporator, means for utilizing the vapors from the said first effect of the evaporator as heating and scrubbing medium for the said scrubbing column and as heating medium for the second effect of the evaporator, means for recovering the condensate from the succeeding effect of the evaporator, means for utilizing the vapors of each effect as heating media for succeeding effects of the multiple effect evaporator, and means for conducting the liquid under treatment thru the said scrubbing column, multiple effect evaporator and filter.

2. A distillation apparatus comprising a scrubbing column, a multiple effect evaporator, a filter connected between the first and second effects of said evaporator, means for supplying heating medium to the first effect of said evaporator, means for utilizing the vapors from the said first effect of the evaporator as heating and scrubbing medium for the said scrubbing column and as heating medium for the succeeding effect of the evaporator, means for recovering the condensate from the several effects of the evaporator, means for utilizing the vapors of each effect as heating media for succeeding effects of the multiple effect evaporator, and means for conducting the liquid under treatment thru the said scrubbing column, multiple effect evaporator and filter.

3. A distillation apparatus comprising a scrubbing column, a multiple effect evaporator, a filter connected between the second and third effects of said evaporator, means for supplying heating medium to the first effect of said evaporator, means for utilizing the vapors from the said first effect of the evaporator as heating and scrubbing medium for the said scrubbing column and as heating medium for the succeeding effect of the evaporator, means for recovering the condensate from the several effects of the evaporator, means for utilizing the vapors of each effect as heating media for succeeding effects of the multiple effect evaporator, and means for conducting the liquid under treatment thru the said scrubbing column, multiple effect evaporator and filter.

4. A distillation apparatus comprising a scrubbing column, a multiple effect evaporator, a filter connected between the third and fourth effects of said evaporator, means for supplying heating medium to the first effect of said evaporator, means for utilizing the vapors from the said first effect of the evaporator as heating and scrubbing medium for the said scrubbing column and as heating medium for the succeeding effect of the evaporator, means for recovering the condensate from the several effects of the evaporator, means for utilizing the vapors of each effect as heating media for succeeding effects of the multiple effect evaporator, and means for conducting the liquid under treatment thru the said scrubbing column, multiple effect evaporator and filter.

5. A plant for the recovery of concentrated ammonia and salts of organic acids comprising a scrubbing column, a plurality of evaporator bodies, a filter connected in series between two of said evaporator bodies, means for introducing the liquid to be treated into the top of said scrubbing column, means for introducing the liquid from said scrubbing column into the bottom of the first evaporator body, means for supplying heating medium to the first evaporator body, means for utilizing the vapors from said first evaporator body as heating and scrubbing medium for the said scrubbing column and as heating medium for the succeeding evaporator body, means for recovering the condensate from the said evaporator bodies, means for utilizing the vapors from the second and succeeding evaporator bodies as heating medium for each succeeding evaporator body, means for passing the liquid being treated thru the said scrubbing column, evaporator bodies, and filter.

In testimony whereof we affix our signatures.

LEONARD E. CARLSMITH.
B. CLARK BOECKELER.
IGNACE J. KRCHMA.